United States Patent [19]

Ribka et al.

[11] 3,966,689
[45] June 29, 1976

[54] POLYMERS BASED ON N-FORMYL-N'-ACRYLOYL-METHYLENEDIAMINES

[75] Inventors: Joachim Ribka, Offenbach am Main-Burgel; Friedrich Engelhardt, Frankfurt am Main-Fechenheim; Steffen Piesch, Oberursel, Taunus, all of Germany

[73] Assignee: Casella Farbwerke Mainkur Aktiengesellschaft, Germany

[22] Filed: Jan. 30, 1975

[21] Appl. No.: 545,550

Related U.S. Application Data

[62] Division of Ser. No. 408,488, Oct. 23, 1973, abandoned.

[30] Foreign Application Priority Data

Oct. 23, 1972  Germany............................ 2251922

[52] U.S. Cl.............................. 526/306; 526/317; 526/319; 526/321; 526/322; 526/330; 526/338; 526/342; 526/347; 528/503
[51] Int. Cl.².......................................... C08F 22/38
[58] Field of Search............... 260/80.3 N, 89.7 R; 450/742, 743.5

[56] References Cited

UNITED STATES PATENTS

| | | | |
|---|---|---|---|
| 3,255,139 | 6/1966 | Dinges et al.............. | 260/80.3 N X |
| 3,694,506 | 9/1972 | Franco et al.............. | 260/89.7 R X |

*Primary Examiner*—William F. Hamrock
*Attorney, Agent, or Firm*—Connolly and Hutz

[57] ABSTRACT

Linear addition polymers of a compound of the formula

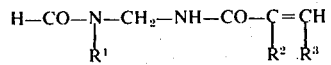

wherein $R^1$, $R^2$ and $R^3$ are hydrogen or alkyl having 1 to 5 carbon atoms, said polymers being thermally crosslinkable at temperatures below 100°C. to produce moulded products, lacquers and coatings and to fix pigments to fibers and films of natural and synthetic origin.

7 Claims, No Drawings

POLYMERS BASED ON N-FORMYL-N'-ACRYLOYL-METHYLENEDIAMINES

CROSS-REFERENCE TO RELATED APPLICATION

This application is a division of application Ser. No. 408,488 filed Oct. 23, 1973 and now abandoned.

It is known that copolymers containing N-methylolacrylamide or N-methylolmethacrylamide crosslink in the acid pH range or with the addition of substances which react acidly or give off acid. In order to achieve the most rapid and complete crosslinking as possible, commercial utilization of this reaction is carried out at elevated temperatures of between 80° and 200°C. (German published application No. 1 719 370). Polymers which have been prepared by copolymerization with Mannich bases (German published application No. 1 102 404) or with methylol ethers of acrylamide or methacrylamide (German published application No. 1 035 363) behave analogously.

It is also known that polymerization of monomers of the formula

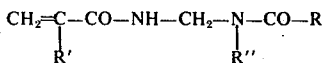

wherein R' is hydrogen, chlorine or methyl and R and R'' are alkyl having 1 to 8 carbon atoms, aryl, cycloalkyl or aralkyl or R and R'' together complete a heterocyclic ring, with other olefinically unsaturated copolymerizable compounds in aqueous dispersion produces self-crosslinking mixed polymers (German published application No. 1 217 070).

The aforesaid polymers have known disadvantages. They are either unstable in the acid pH range, not sufficiently stable on storage or it is impossible to prepare water soluble copolymers with more than 10% free acrylic or methacrylic acid, without premature crosslinking occurring.

It has now been found that polymers which may be crosslinked thermally below 100°C., may be prepared, which are stable in the pH range of 2.0 to 9.0, and that these polymers may contain incorporated therein up to 90% acrylic or methacrylic acid in the macromolecule.

The present invention relates to uncrosslinked linear addition polymers which are capable of crosslinking at elevated temperatures and contain at least 0.2% by weight of a compound of the formula

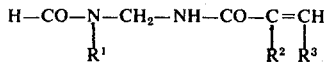

wherein $R^1$, $R^2$ and $R^3$ are hydrogen or alkyl having 1 to 5 carbon atoms. Preferably, $R^2$ and $R^3$ are hydrogen or methyl.

The compounds of formula I are prepared by reacting a substituted formamide of formula II with an amide of formula III under conditions which produce water as by-product and in accordance with the equation:

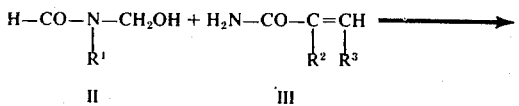

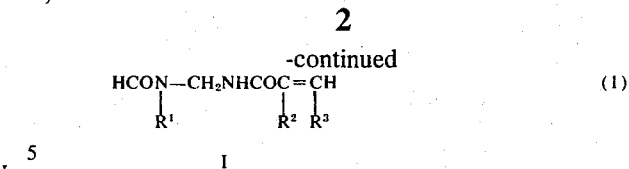

The aforesaid reaction may be carried out, depending on the reactivity of the reactants, at room temperature (20°C.) or at elevated temperature. Normally, temperatures of 70° to 130°C. are sufficient. Although the reaction may be carried out in the absence of solvent, it is preferred to dissolve the reactants in a suitable reaction inert solvent. Such solvents include halogenated hydrocarbons such as methylene chloride, chloroform, ethylene chloride and trichloroethylene; hydrocarbons such as benzene, toluene and xylene; ethers such as tetrahydrofuran and dioxan; dimethylformamide and alcohols such as tertiary butanol.

The addition of an acid catalyst generally promotes the reaction rate. Suitable acid catalysts include proton acids or Lewis acids, i.e., inorganic acids such as hydrochloric, sulfuric, phosphoric and nitric acids; organic carboxylic acids such as formic, acetic and trichloroacetic acids; sulfonic acids such as p-toluene sulfonic acid; zinc nitrate; zinc chloride; boron trifluoride; boron trifluoride etherate; ammonium chloride and ammonium nitrate. Based on a unimolar conversion, 0.1 to 5 g of the acid catalyst are added.

It is appropriate to add a polymerization inhibitor to prevent any possibility of a reaction at the double bond. Such inhibitors include phenothiazine, hydroquinone, benzocatechol, resorcinol and the monomethyl ether of hydroquinone in an amount of about 0.1 to 2 g, based on unimolar conversion.

The reaction mixture is agitated for 1 to 15 hours, the time depending upon the reaction temperature and other factors. By-product water may be distilled off under vacuum (when working witout solvent) or azeotropically (when working with solvent). However, distillation of the by-product water is not required.

If the reaction is carried out in the absence of solvent, i.e., in the melt, the reaction product, in most instances, may be further utilized immediately. When employing a solvent, the reaction product often precipitates as crystals. However, isolated crude product may often be used without recrystallization.

The formamide reactants of formula II are readily prepared from a formamide of formula IV and formaldehyde of formula V according to the equation:

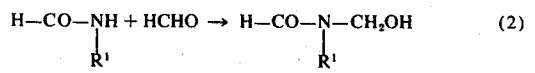

In lieu of formaldehyde in the foregoing reaction, paraformaldehyde, trioxane and aqueous formaldehyde may be employed.

Reaction (2) is carried out at elevated temperatures of 50°–150°C. at a reactant molar ratio of 1:1. Agitation until a homogeneous solution or a melt results is employed. Suitable solvents for the reaction include those discussed above in connection with reaction (1). Moreover, an excess of substituted formamide of formula IV may be utilized as solvent in the event this formamide melts at the reaction temperature. The pH of the solution or reaction melt should be between 5 and 9.

It is not necessary that the reaction product of formula II be isolated on termination of reaction (2). Instead, it may be reacted immediately following reaction (1) and the addition of the compound of formula III, as well as the addition of any employed solvent, catalyst or polymerization inhibitor.

The homopolymerization of the compounds of formula I or the copolymerization thereof with one or more copolymerizable olefinically unsaturated monomers may be carried out in bulk, in solution or in emulsion without crosslinking of the resulting polymer. The monomers of formula I for copolymerization purposes are employed in an amount of 0.2 to 50% by weight, based on total monomers, and preferably in an amount of 0.5 to 30% by weight.

As previously indicated, all copolymerizable olefinically unsaturated monomers may be employed for the preparation of the copolymers of the instant invention. Typical examples of these include vinyl benzenes, α, β-unsaturated mono- and dicarboxylic acids, amides, nitriles and esters of said acids, monoolefins, conjugated diolefins and esters of vinyl alcohols.

Examples of vinyl benzenes includes styrene, α methylstyrene, vinyl toluene, styrene sulfonic acid and p-chlorostyrene.

Examples of α, β-unsaturated mono- and dicarboxylic acids include acrylic acid, methacrylic acid, crotonic acid, maleic acid and fumaric acid. Examples of the stated derivatives of the aforesaid acids include acrylic and methacrylic acid amide, acrylic and methacrylic acid nitrile and esters of acrylic and methacrylic acid. The preferred esterifying alcohols include alkanols having 1 to 18 carbon atoms and cycloalkanols having 3 to 8 carbon atoms such as methyl, ethyl, propyl, isopropyl, isobutyl, hexyl, octyl and stearyl alcohols, glycidol and cyclohexanol. Additionally, benzyl alcohol and phenol may be used for esterifying purposes.

Another group of useful esters of the stated α, β-unsaturated carboxylic acids include monoesters wherein the esterifying alcohol is a difunctional saturated alcohol such as 2-hydroxyethylmethacrylate, 2-hydroxypropylmethacrylate, 4-hydroxybutylmethacrylate, 2-hydroxyethylacrylate, 2-hydroxypropylacrylate, 4-hydroxybutylacrylate, as well as the corresponding diesters.

Typical olefins and conjugated diolefins include, for example, ethylene, propylene, butadiene, isoprene, and dimethylbutadiene. Furthermore, unsaturated ethers, ketones and halogen compounds such as vinyl ether, vinyl ketone, vinyl halide, vinylidene chloride and chloroprene are examples of other copolymerizable olefinically unsaturated monomers.

Preferred esters of vinyl alcohols include vinyl acetate and vinyl propionate. Additional comonomers include methylolamide, acrylamide, methacrylamide their Mannich bases and methylol ether, vinyl, allyl and methallyl sulfonic acids, basic esters of acrylic and methacrylic acids such as methacrylic acid dimethylaminoethyl ester and the quaternization products thereof, diallylammonium compounds and vinyl pyridine. The copolymers may, of course, contain one or more of the copolymerizable olefinically unsaturated monomers.

Polymerization is carried out in known fashion in solution, in aqueous emulsion or dispersion or in substance (bulk) at temperatures of between 10° and 80°C., preferably between 40° and 75°C. at normal or elevated pressure. Preferably, the thermally crosslinkable copolymers are prepared by polymerization in aqueous emulsion or dispersion, in aqueous solution or in water-alcohol mixtures. The alcohols may be mono- or polyfunctional. Typical examples thereof include methanol, ethanol, isopropanol and ethylene glycol. The polymerization can be carried out in the presence of all free radical yielding substances, including, for example, organic per compounds such as acyl peroxides, e.g., benzoyl peroxide, alkyl hydroperoxides such as tertiary butyl hydroperoxide; cumene hydroperoxide; p-methane hydroperoxide; dialkyl peroxides such as di-tert. butyl hydroperoxide and inorganic per compounds such as potassium, sodium and ammonium persulfate, hydrogen peroxide and percarbonates.

It is convenient to use the organic and inorganic per compounds in combination with reducing agents in the known manner. Suitable reducing agents include, for example, sodium pyrosulfite, sodium bisulfite and rongalite. Particularly advantageous results are achieved with Mannich adducts of sulfinic acids, aldehydes and amino compounds as described in German Pat. No. 1 301 566.

Molecular weight regulating agents, for example, alcohols, alkyl mercaptans and certain halogenated compounds may be present during polymerization. Polymerization may be effected under pressure.

Copolymerization in aqueous emulsion occurs most suitably with the addition of emulsifiers such as ethoxylated fatty alcohols or phenols (ethoxylated octylphenol or oleylalcohol), or of sulfated or sulfonated fatty alcohols.

The linear addition polymers of the present invention are extraordinarily stable on storage at normal temperature in the pH range of 2 to 9 and crosslink on their own upon heating to temperatures below 100°C. At temperatures above about 50°C., crosslinking may be accelerated by the addition of acids or compounds which yield acid by-products or by the addition of alkaline compounds. The uncrosslinked polymers of this invention having a high content of acrylic and/or methacrylic acid are capable of yielding completely clear solutions which may be diluted as desired with water.

The crosslinked polymers of this invention are insoluble in water and inorganic solvents. Moulded products, lacquer coatings and other coatings may be prepared by thermally crosslinking the linear addition polymers of the present invention. Additionally, the linear addition polymers of this invention may be employed for the fixing of inorganic and organic pigment dyestuffs on fiber and film materials of natural and synthetic origin such as native or regenerated cellulose, acetylated cellulose, wool, silk, polyamides, polyesters, polyacrylonitrile, polyvinyl chloride, glass, asbestos, paper and cardboard. Typical pigments include titanium dioxide, ferric hydroxide, metal powders such as aluminum and bronze powder, carbon black, ultramarine blue and other oxidic or sulfitic inorganic pigments, azo pigments, quinoline and indigo vat dyes, phthalocyanine dyes, bix-oxazine dyes, etc. The procedure employed for fixing the pigment to the fibers and films merely involves introducing the material to be dyed into a solution or emulsion of the desired pigment containing a linear addition polymer of the present invention and dyeing in the usual manner. Following drying, the dye may be fixed by dry heating at the appropriate crosslinking temperature. The resulting dyes and prints are distinguished by outstanding fastness to rubbing, washing and chemical cleaning.

EXAMPLE 1

Into a flask equipped with agitator, gas inlet pipe and bottom valve are introduced 400 ml deionized water. While passing through a weak nitrogen stream, 25 g Mersolat H (serves as emulsifier) are dissolved and then 336 g acrylic acid butyl ester, 20 g acrylonitrile and 20 g of a compound of the formula

are emulsified for about 30 minutes. Then about 150 ml of the monomer emulsion are withdrawn through the bottom valve into a flask, which is equipped with an agitator, thermometer, two dropping funnels, gas inlet pipe, feed for the monomer emulsion and water bath. The temperature of the monomer emulsion in the reaction flask, through which a weak nitrogen stream is conducted, is brought to 40°C (water bath) and then from separate dropping funnels is begun dropwise addition of 4.0 g ammonium peroxydisulfate dissolved in 50 ml water and 1.0 g sodium pyrosulfite dissolved in 50 ml water.

Polymerization begins in a short time, the temperature of the reaction mixture rising to 46°–48°C. The remaining monomer emulsion and catalyst solutions are allowed to run in during a period of 2 hours in such a manner that a temperature of 48°C is not exceeded. Upon completion of polymerization, agitating is continued for 1 hour at 50°C.

The resulting dispersion of the uncrosslinked polymer has a solids content (resin content) of 38.7% by weight and a pH value of 2.4. It may be further diluted if desired. A polymer film dried at 95°C consists of the crosslinked polymer and is flexible, insoluble in water, trichloroethylene and dimethylformamide.

A cotton fabric is padded with a pad liquor consisting of:
  20 Parts by weight per liter of a 32% aqueous dispersion of copper phthalocyanine
  100 pbw/l of the above-described polymer dispersion
  20 pbw/l of an aqueous solution of ammonium salt of a polyacrylic acid and
  15 pbw/l of an organic, acid-releasing compound (hydrochloride of an aminoalcohol)
with a liquor absorption of about 60%. Upon drying, the dye is fixed by dry heating at 170°C. for 2 minutes. There is obtained a strong blue dyeing having very good fastness properties.

The necessary N-acryloyl-N'-formylmethylenediamine may be prepared by agitating 450 g formamide and 300 g paraformaldehyde (10 mol each) for 1 hour at 110°C to obtain a clear melt of N-methylolformamide, cooling it to 40°C and stirring while adding 2 l cyclohexane, 30 g hydroquinone monomethylether, 710 g acrylamide and 75 ml concentrated hydrochloric acid. Then the reaction water is distilled off azeotropically and the residue, while hot, is poured into a separating funnel and the lower layer is separated. It consists of N-formyl-N'-acryloyl-methylenediamine.

Yield: 1250 g (97% of theory) practically free of methylene bis-acrylamide. After standing, the substance crystallizes. Melting point 128°C (decomposition).

If in the above example the cyclohexane is substituted by the same quantity of benzene and the procedure otherwise is as described, equally good results are obtained.

In place of hydrochloric acid, there may also be used phosphoric acid, p-toluene sulfonic acid, borontrifluoride etherate, sulfuric acid, trifluoroacetic acid, trichloroacetic acid or the like.

EXAMPLE 2

In the polymerization apparatus described in Example 1, a monomer emulsion, having the composition given below, is polymerized for 4 hours at 40°–42°C:
  160 g vinyl acetate
  200 g acrylic acid butylester
  50 g N-acryloyl-N'-formylmethylene diamine having the formula H — CO — NH — CH$_2$ — NH — CO — CH = CH$_2$
  500 ml water deionized
  10 g olefin sulfonate
  10 g TRITON X100 (emulsifier)
  5 g lauryl sulfate As catalyst components are used 4.2 g sodium peroxydisulfate dissolved in 50 ml water and 2.0 g 1-methyl-hydrogen-3-(p-tolylsulfonyl)-2-aza-succinate of the formula

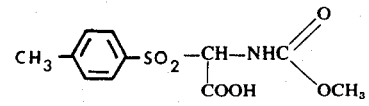

dissolved in 50 ml 2N sodium hydroxide. The homogeneous dispersion of the uncrosslinked polymer which is obtained has a polymer content of 39.6% by weight and a pH value of 2.8.

The flexible polymer film dried at 110°C, consists of crosslinked polymer which is insoluble in water and organic solvents.

The necessary N-acryloyl-N'-formylmethylene diamine may be prepared as follows: 450 g formamide (10 mol) and 300 g paraformaldehyde are agitated for 3 hours at 110°C, the reaction mixture is cooled to 60°C, 350 g (5 mol) acrylamide are introduced, then 1 g para-toluene sulfonic acid is added and the mixture is stirred 4 hours at 60°C. There is obtained a clear solution (50% in methylolformamide) of N-acryloyl-N'-formylmethylene diamine.

The 1-methyl-hydrogen-3(p-tolylsulfonyl)-2-aza-succinate employed as the reducing catalyst constituent was prepared as follows: 7.5 g methylcarbamate, 17.8 g p-toluene sulfinic acid sodium salt, 26 g glyoxylic acid (40% solution in water), 100 ml water and 20 g formic acid (85%) are agitated 5 hours at 40°C. After 2 hours, the solution becomes turbid as a result of initial crystallization of the reaction product. Upon completion of the reaction, the product is cooled to 10°C., recovered, and washed with iced water. After drying over phosphorus pentoxide, there are obtained 29.5 g. (76% of theory) of 1-methyl-hydrogen-3-(p-tolylsulfonyl)-2-aza-succinate having a melting point of 101°C.

A polyamide-6 textile is printed by roller printing with the following paste:

80 pbw of a 30% aqueous carbon black dispersion
  200 pbw of the above-described 39.6% polymer dispersion
  700 pbw of an oil-in-water emulsion having the -continued
composition given below
20 pbw of a 33% aqueous diammonium phosphate solution
1000 parts by weight After drying and 1-minute heating to 185°C. there results a black print with soft feel and very good fastness properties.

The oil-in-water emulsion is obtained if a solution consisting of 8 pbw of the reaction product of 13 mol ethylene oxide with 1 mol triisobutylphenol, 50 pbw of a 3% aqueous solution of a carboxymethylcellulose or of an alginate and 62 pbw water and 880 pbw heavy gasoline having a boiling range of 180°–230°C. is emulsified.

EXAMPLE 3

In a polymerization apparatus analogous to that described in Example 1, a monomer emulsion of the composition given below is polymerized for 2½ hours at 63°–65°C.:

500 g. acrylonitrile
1550 g. acrylic acid butyl ester
25 g. N-methylolacrylamide
75 g. of a compound of the formula

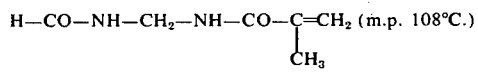

4000 ml. water (deionized)
80 g. Mersolat H (emulsifier)

Added as catalysts are 12 g. potassium peroxydisulfate and 24 g. sodium pyrosulfite dissolved in 800 ml. water each.

The homogeneous dispersion of the uncrosslinked polymer which is obtained has pH value of 6.7 and a polymer content of 29.8% by weight.

The tough flexible polymer film dried at 90°C., which consists of crosslinked polymer, is insoluble in water and organic solvents.

EXAMPLE 4

A monomer emulsion, having the composition given below, was polymerized for 4 hours at 50°C. in an autoclave of VA steel:

150 g. acrylonitrile
100 g. butadiene
15 g. methacrylic acid
5 g. of a compound of the formula

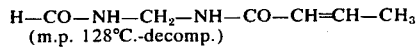

700 ml. water deionized
20 g. TRITON X 200 (emulsifier)
10 g. olefin sulfonate
0.5 g. dodecylmercaptan and
2.0 g. sodium peroxydisulfate and
1.0 g. 1-methyl-hydrogen-3-(p-tolylsulfonyl)-2-azasuccinate of the formula

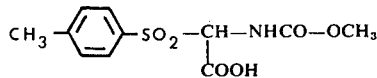

as the catalyst components.

The obtained homogeneous dispersion of the uncrosslinked polymer has a polymer content of 25.7% by weight. The crosslinked soft, flexible polymer film obtained from the polymer by drying at 95°C. is insoluble in water and organic solvents.

A polyamide-6 fabric is padded on a pad with an aqueous bath containing per liter:
20 pbw of a 46% aqueous dispersion of chlorinated copper phthalocyanine
100 pbw of the above described polymer dispersion
20 pbw of an aqueous solution of the sodium salt of polyacrylic acid and
15 pbw of an organic acid-liberating compound.

The fabric is squeezed to about a 50% liquor absorption, dried at 100°C. and subjected to a heat treatment for 2 minutes at 170°C. There is obtained a green pigment coloration with very good fastness properties and soft feel.

EXAMPLE 5

A monomer solution, having the composition given below, is polymerized at 62°C. for 1 hour in the polymerization apparatus described in Example 1:

200 g. acrylic acid butyl ester
100 g. acrylonitrile
30 g. acrylamide
60 g. acrylic acid
5 g. of a compound of the formula

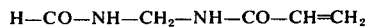

The crosslinked polymer film prepared by drying the uncrosslinked polymer at 80°C, is hard and insoluble in water and organic solvents.

What is claimed is:

1. A linear addition copolymer which is prepared by the process of polymerizing from 0.2 to 50% by weight of a monomer of the formula

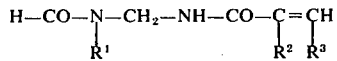

wherein $R^1$, $R^2$ and $R^3$ are hydrogen or alkyl having 1 to 5 carbon atoms and at least one copolymerizable olefinically unsaturated monomer, said polymerization being carried out at a temperature between 10° and 80°C. and in the presence of a free radical yielding substance.

2. The linear addition copolymer of claim 1 wherein each of $R^2$ and $R^3$ is hydrogen or methyl.

3. The linear addition copolymer of claim 1 which has been thermally crosslinked.

4. The linear addition copolymer of claim 1 wherein the copolymerizable olefinically unsaturated monomer is selected from the group consisting of vinyl benzenes, α,β-unsaturated mono- and dicarboxylic acids, amides, nitriles and esters of said acids, monoolefins, conjugated diolefins and esters of vinyl alcohols.

5. The linear addition copolymer of claim 1 containing about 0.5 to 30% by weight of said monomer of said formula.

6. The linear addition copolymer of claim 1, wherein said at least one copolymerizable olefinically unsaturated monomer is an olefinically unsaturated ester.

7. The linear addition copolymer of claim 6, wherein said at least one copolymerizable olefinically unsaturated ester is a mixture of vinyl acetate and acrylic acid butyl ester.

* * * * *